UNITED STATES PATENT OFFICE 2,413,219

MANUFACTURE OF BRUSH BACKS

Gaetano F. D'Alelio, Northampton, Mass., assignor to Pro-phy-lac-tic Brush Company, Northampton, Mass., a corporation of Delaware No Drawing. Application June 16, 1944,
Serial No. 540,743

2 Claims. (Cl. 15—159)

This invention relates to the manufacture of brushes and more particularly to bristle blocks or brush backs having polystyrene as the major component.

Customarily in the manufacture of brushes by machinery, a plurality of brush bodies or bristle blocks are supported in a carrier which moves step by step to bring a brush body to a desired position opposite a drill which is movable axially to form a hole in the brush body. At the same time, one of the previously drilled holes is opposite the end of a tube having a longitudinal passage in which a pusher is axially movable. Mechanism cooperates with the tube and pusher to position a tuft across the passage in the tube and also to position a staple in the path of movement of the pusher. The tube is moved axially into engagement with the brush body and the pusher is moved within the tube to fold the tuft and position the staple in the fold and force the folded tuft and staple through the passage in the tube and into the drilled hole in the brush body thereby causing the edges of the staple to become embedded in the walls of the hole and retain the tuft in place. Drilling the block and forcing the staple and tuft places a severe strain on the brush back or bristle block.

It has become common in recent years to form bristle blocks from plastic materials by injection molding. In the manufacture of bristle blocks for plastic materials it is desirable to select a plastic composition from which the bristle block can be shaped by injection molding for reasons well understood by those skilled in the art. Polystyrene is a low cost plastic which can be injection molded but it has proved to be unsuitable for bristle blocks because they crack or break during drilling and stapling even when the polystyrene is compounded with plasticizers. I have discovered that this difficulty may be overcome thus making this low cost and attractive material available for bristle blocks.

The present invention is based upon my discovery that polystyrene compounded with at least 10 per cent of a finely divided fibrous filler together with at least 5 per cent of a compatible plasticizer by weight can be injection molded and subsequently drilled and stapled at standard production speeds. If the plasticizer is omitted from the composition it cannot be shaped by injection molding to form a satisfactory bristle block.

A composition suitable for bristle blocks should contain polystyrene as the major component and in an amount not less than 60 to 65 per cent. At least about 10 per cent of a fibrous filler, preferably a cellulosic filler, is required but a larger quantity may be used advantageously. Too large a proportion of the fibrous filler tends to render the bristle block water absorptive and for this reason I prefer to use not more than about 20 to 25 per cent. The fibrous filler should be finely divided to about 100 mesh or finer. Pigments may be added to impart a desired color. The composition should contain not less than about 5 per cent of a compatible plasticizer but no advantage accrues in the use of more than about 10 to 15 per cent.

Examples of suitable fibrous fillers are alpha flock, wood flour, cotton flock, ground lignin, lignocellulose, etc. Examples of suitable plasticizers are diethyl phthalate, dibenzyl sebacate, dioctyl phthalate, dicapryl phthalate, diethylene glycol dihexoate, polycyclic cycloaliphatics, chlorinated diphenyls, etc.

The following is my present preferred composition for use in making hair brush backs:

|  | Parts by weight |
| --- | --- |
| Polystyrene | 70.5 |
| Wood flour | 17.5 |
| Titanium dioxide | 5.0 |
| Diethyl phthalate | 7.0 |

The above ingredients were placed in a Banbury mixer in the order listed and each thoroughly mixed in before the next was added. The total compounding time was approximately 20 minutes. The resulting compound was used to produce hair brush backs by injection molding in a standard injection molding machine. These brush backs were drilled and stapled under standard production conditions without cracking and formed satisfactory brushes. In the above example polystyrene scrap or copolymers of polystyrene in which the styrene component is in the major proportion may be used instead of the virgin polystyrene.

I claim:

1. In a brush having the brush bristles stapled in drilled holes in the bristle block, the improvement in which said bristle block is formed of a composition comprising not less than 60 percent of polystyrene, 5 to 15 percent of a plasticizer for the polystyrene, and at least 10 but not more than about 25 percent of wood flour.

2. In a brush having the brush bristles stapled in drilled holes in the bristle block, the improvement in which said bristle block is formed of a composition comprising about 70.5 percent of polystyrene, about 17.5 percent wood flour, about 7 percent of a plasticizer for the polystyrene, and about 5 percent of pigment.

GAETANO F. D'ALELIO.